United States Patent [19]

Askew et al.

[11] 4,013,818

[45] Mar. 22, 1977

[54] HIGH TEMPERATURE SECONDARY BATTERIES

[75] Inventors: Barry Anthony Askew, Broadstone; Ronald Holland, Wareham, both of England

[73] Assignee: National Research Development Corporation, London, England

[22] Filed: Sept. 25, 1975

[21] Appl. No.: 616,821

[30] Foreign Application Priority Data

Sept. 28, 1974 United Kingdom ............ 42248/74

[52] U.S. Cl. .............................. 429/112; 429/153; 429/218; 429/221

[51] Int. Cl.² ...................................... H01M 43/00

[58] Field of Search ................ 136/6 L, 6 LF, 6 R; 136/20, 83 R, 83 T, 100 R, 153, 111; 429/103, 112, 199, 153, 218, 221

[56] References Cited

UNITED STATES PATENTS

| | | | |
|---|---|---|---|
| 2,671,125 | 3/1954 | Heraud | 136/111 X |
| 3,847,675 | 11/1974 | Sharma | 136/133 |
| 3,885,989 | 5/1975 | Bush | 136/83 T |
| 3,895,959 | 7/1975 | Dehmelt | 136/6 R |
| 3,925,098 | 12/1975 | Saunders et al. | 136/6 LF |

Primary Examiner—Anthony Skapars
Attorney, Agent, or Firm—Cushman, Darby & Cushman

[57] ABSTRACT

The invention concerns a high temperature lithium-sulphur secondary battery. The cells of the battery are arranged in a stack, and each cell consists of a pellet of immobilized electrolyte sandwiched between a lithium containing negative electrode pellet and a metal sulphide positive electrode. Intercell metal sheets both maintain electrical contact and inhibit chemical reaction between the electrodes of adjacent cells, and the stack of cells is enclosed in a close-fitting tube of chemically inert and electrically insulating material.

12 Claims, 2 Drawing Figures

HIGH TEMPERATURE SECONDARY BATTERIES

This invention relates to secondary batteries and more particularly to high temperature/high energy density secondary batteries.

Applications of rechargeable batteries especially in the field of electric propulsion are at present restricted by the weight, cost and limited reliability of the batteries available. Considerable research is being directed towards development of high temperature batteries using alkali metals (lithium or sodium) as the negative electrode material and sulphur on a metal sulphide as the positive electrode material. One such system uses lithium-aluminium alloy coupled with iron sulphide (monosulphide or disulphide) and a molten salt electrolyte based on mixed halides of the alkali metals (typically an eutectic mixture of lithium chloride and potassium chloride). Such cells are hermetically sealed after being filled with electrolyte. Ceramic insulting materials inert to lithium are used as electrode separators and for insulation of electrical feed-throughs. The cost of these materials and the complexity of cell design are major factors determining the likely cost of the system.

Development of a low cost high energy density battery with a life of the order of 1000 cycles could revolutionise transport and thus contribute to energy conservation and reduction of atmospheric pollution.

It is an object of the present invention to simplify cell design and avoid the use of expensive insulating materials.

According to the present invention, a high temperature secondary battery comprises a stack of cells each cell having a pellet of immobilised electrolyte sandwiched between a negative electrode pellet composed at least partially of lithium and a positive electrode pellet composed at least partially of a metal sulphide, and an intercell sheet adapted to prevent direct chemical action between the electrode pellets of adjacent cells whilst maintaining electrical contact between them.

The electrolyte pellet is preferably prepared from a mixture of alkali metal halides at least one of which is a lithium salt and is immobilised by inclusion of a finely divided high melting powder which is inert to the reactants. The preferred immobilising powder is lithium fluoride.

The negative electrode pellet is preferably prepared from a mixture of a lithium alloy (e.g. lithium-aluminium) and the electrolyte material. Alternatively metallic lithium impregnated into a porous nickel matrix may be used.

The positive electrode pellet is preferably prepared at least partially from a metal sulphide powder. The metal sulphide powder is preferably iron sulphide, in which case the positive electrode is prepared from a mixture of iron sulphide and electrolyte material. The intercell sheet may conveniently be a sheet of stainless steel, though other metals may be used.

The stack of cells is encased in a close-fitting tube of chemically inert electrically insulating material, such as hot-pressed lithium fluoride. One or more such stacks may be enclosed in a hermetically sealed container with appropriately insulated ant sealed terminals.

Batteries according to the invention operate typically in the temperature range 375° to 450° C. The heat required to raise the battery to this temperature is supplied initially from an external source such as an external electrical supply to heating coils. Thermal insulation around the battery is used to minimise heat loss and further heat to maintain the temperature may be supplied from the external source, from the battery output or by heat generated within the battery during charge and discharge.

An embodiment of the present invention will now be described, by way of example only, with reference to the accompanying drawings, in which.

Figure 1:
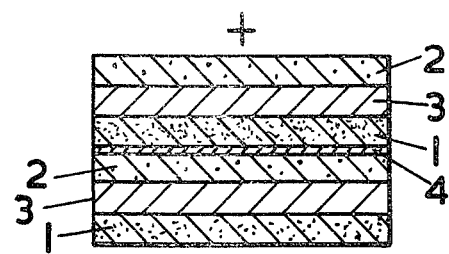
FIG. 1 illustrates diagrammatically two cells of the invention

Referring to FIG. 1 there is illustrated the general arrangement of pellets and intercell connections. Each cell has a negative electrode pellet 1, a positive electrode pellet 2 and an electrolyte pellet 3. An intercell connector 4 acts to provide electrical contact between the negative electrode pellet 1 of one cell and the positive electrode pellet 2 of the adjacent cell and to prevent chemical action between them.

Figure 2:
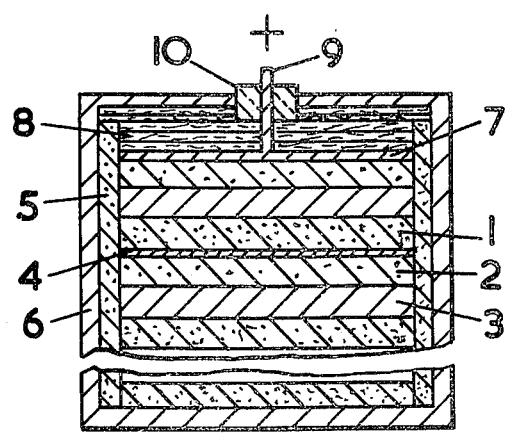
FIG. 2 illustrates diagrammatically a simple battery incorporating a stack of the cells of FIG. 1.

FIG. 2 shows the general arrangement of FIG. 1 incorporated into a simple battery.

The electrolyte pellet 3 is pressed from a mixture of 30% by weight of lithium chloride-potassium chloride eutectic and 70% lithium fluoride as immobiliser. The negative electrode pellet 1 is fabricated by pressing together lithium-aluminium alloy and 10–20% by weight of the electrolyte material. The positive electrode pellet 2 is pressed from a mixture of 70% by weight of iron sulphide and 30% by weight of electrolyte material.

The intercell connector 4 is a disc of stainless steel of the same diameter as the pellets. The stack is enclosed in a close fitting tube of lithium fluoride 5 which is in turn enclosed in a stainless steel can 6 with a welded lid. A current collector 7 at the positive end of the stack is a stainless steel sheet insulated from the lid by layers of asbestos paper 8. A positive terminal 9 passes through a metal glass seal 10 in the welded lid. The body of the can 6 acts as a negative terminal.

An alternative example of a method of producing electrode pellets in the laboratory for demonstration purposes is to form the negative electrode pellet 1 by pressing equal parts by weight of aluminium powder and lithium chloride-potassium chloride eutectic. The positive electrode pellet 2 is formed from a mixture of 70% by weight of iron sulphide and 30% by weight of lithium chloride-potassium chloride eutectic which mixture has been previously discharged electro-chemically against a lithium electrode. It should be added for clarity that the iron sulphide/lithium chloride-potassium chloride eutectic mixture is made into a cell with a lithium impregnated metal foam negative electrode and an immobilised electrolyte of lithium chloride-potassium chloride and lithium fluoride. The cell is then discharged, dismantled and the positive electrode removed, powdered and repressed in the form of the pellet 2.

In this alternative example therefore the battery is assembled in the discharged condition and requires a conditioning charge in order to recharge the positive electrodes 2 and convert the aluminium powder of the negative electrodes 1 into a porous lithium-aluminium structure.

With pellets of positive electrode 2, negative electrode 1 and electrolyte 3, each 1 mm thick, and 35 mm diameter the battery has been subjected to repeated charge-discharge cycling at current densities of the order of 25 mA/cm$^2$, each discharge lasting for over 3 hours at an average voltage of 1.5 V per cell.

What we claim is:

1. A high temperature lithium-sulphur secondary battery comprising a stack of cells, each cell including a pellet of immobilized electrolyte sandwiched between a negative electrode pellet composed at least partially of lithium and a positive electrode pellet composed at least partially of a metal sulphide, and an intercell metal sheet adapted to prevent direct chemical action between the electrode pellets of adjacent cells while maintaining electrical contact between them, the pellets being contained within a close-fitting tube of material which is both (1) electrically insulating at the battery operating temperature and (2) chemically inert with respect to the electrodes, the electrolyte and the battery reaction.

2. A high temperature lithium-sulphur secondary battery according to claim 1 in which the material of the tube is lithium fluoride.

3. A high temperature lithium-sulphur secondary battery according to claim 1 in which the electrolyte consists at least partially of a lithium halide.

4. A high temperature lithium-sulphur secondary battery according to claim 2 in which the electrolyte consists at least partially of a lithium halide.

5. A high temperature lithium-sulphur secondary battery according to claim 3 in which the electrolyte pellet is immobilised by the addition of a finely divided high melting point powder which is inert to the reactants.

6. A high temperature lithium-sulphur secondary battery according to claim 4 in which the electrolyte pellet is immobilised by the addition of a finely divided high melting point powder which is inert to the reactants.

7. A high temperature lithium-sulphur secondary battery according to claim 1 in which the positive electrode pellet is composed of a mixture of iron sulphide and electrolyte material.

8. A high temperature lithium-sulphur secondary battery according to claim 2 in which the positive electrode pellet is composed of a mixture of iron sulphid and electrolyte material.

9. A high temperature lithium-sulphur secondary battery according to claim 3 in which the positive electrode pellet is composed of a mixture of iron sulphide and electrolyte material.

10. A high temperature lithium-sulphur secondary battery according to claim 4 in which the positive electrode pellet is composed of a mixture of iron sulphide and electrolyte material.

11. A high temperature lithium-sulphur secondary battery according to claim 5 in which the positive electrode pellet is composed of a mixture of iron sulphide and electrolyte material.

12. A high temperature lithium-sulphur secondary battery according to claim 6 in which the positive electrode pellet is composed of a mixture of iron sulphide and electrolyte material.

* * * * *